United States Patent [19]

Moore et al.

[11] Patent Number: 4,523,563
[45] Date of Patent: Jun. 18, 1985

[54] ELECTRONIC CONTROL SYSTEM FOR A FUEL PUMP

[75] Inventors: John H. Moore, Kingscote; Ian J. Harvey, Cricklade, both of England

[73] Assignee: Lucas Industries public limited company, Birmingham, England

[21] Appl. No.: 597,257

[22] Filed: Apr. 6, 1984

[30] Foreign Application Priority Data

Apr. 30, 1983 [GB] United Kingdom ............... 8311917

[51] Int. Cl.³ .............................................. F02D 1/12
[52] U.S. Cl. ............................ 123/359; 123/198 DB
[58] Field of Search ........... 123/359, 357, 358, 198 D, 123/198 DB, 479, 480, 325, 333

[56] References Cited

U.S. PATENT DOCUMENTS

| | | | |
|---|---|---|---|
| 3,596,640 | 8/1971 | Bloomfield | 123/198 DB |
| 3,739,757 | 6/1973 | Ohtani et al. | 123/359 |
| 4,018,201 | 4/1977 | Williams et al. | 123/359 |
| 4,294,204 | 10/1981 | Hurner | 123/198 DB |
| 4,383,511 | 5/1983 | Jones | 123/359 |

Primary Examiner—Magdalen Y. C. Moy

[57] ABSTRACT

An electronic control system for a fuel pump of an internal combustion engine includes a power circuit which controls the flow of electric current in an electromagnetic device coupled to a spill valve of the fuel pump. Power is supplied to the power circuit through a resistor through which power is also supplied to an engine speed sensing circuit. The system also includes a control unit which supplies control signals to the power circuit to effect closure of the valve and hence delivery of fuel, in timed relationship with the engine. The control unit receives the speed signal from the speed sensing circuit and also senses the voltage applied thereto. In addition it receives a demand signal from a transducer and controls current flow in a relay winding having contacts in parallel with the resistor. In normal operation the contacts are closed but in a fault situation with the demand low and the speed high the winding is de-energized and the voltage applied to the power circuit and speed sensing circuit falls below a standby level which is sensed by the control unit to maintain the winding energized.

2 Claims, 1 Drawing Figure

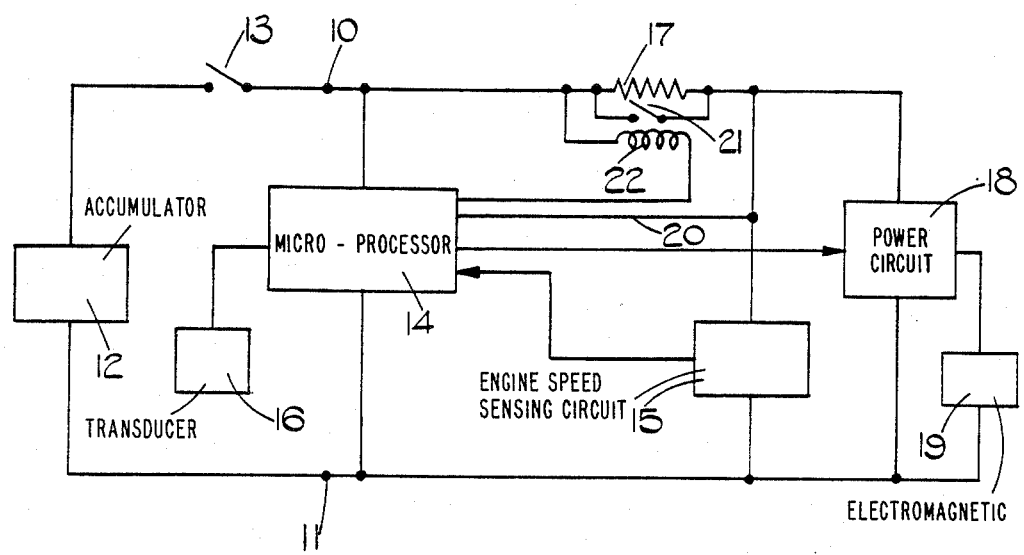

ELECTRONIC CONTROL SYSTEM FOR A FUEL PUMP

This invention relates to an electronic control system for the fuel pump of an internal combustion engine, the pump being of the type including an electromagnetically operable device which when energised ensures that the pump supplies fuel to the associated engine, the control system including a power circuit which controls the flow of current in the device and a control unit responsive to demanded and actual engine operating parameters for providing a control signal to said power circuit.

One form of fuel pump which is capable of control by the control system is a reciprocable plunger pump in which a cylinder containing the plunger has an outlet for connection to an injection nozzle of the associated engine and through which fuel can flow during inward movement of the plunger. Means is provided to fill the cylinder with fuel and the pump includes a spill outlet which is controlled by a valve. The valve is closed when the electromagnetically operable device is energised and when closed fuel contained in the cylinder will be displaced to the engine during the inward movement of the plunger. If however the valve is open or opened during the inward movement of the plunger, the fuel will flow through the spill outlet in preference to flowing to the engine. The maximum displacement of the plunger will be greater than the maximum amount of fuel which can be supplied to the engine so that at some time or times during the inward movement of the plunger the valve must be opened.

The power circuit contains semi-conductor devices for example power transistors and it is possible for failure of such a device to occur. This could cause the valve to be permanently closed. The result would be that the engine would receive more than its allowed maximum amount of fuel and apart from the emission of smoke in the engine exhaust, its speed would no longer be controlled and the engine would accelerate possibly to bursting point.

The object of the invention is to provide a control system of the kind specified in a simple and convenient form.

According to the invention an electronic control system of the kind specified comprises first and second terminals for connection to a source of electric supply by way of a manually operable switch, a resistor connected in series with one of said terminals and the power circuit, a relay having contacts connected in parallel with said resistor, said relay including a winding which is energised under the control of said control unit, to close said contacts, an engine speed sensing circuit which receives power from the end of the resistor remote from the supply terminal and which supplies an engine speed signal to the control unit, said control unit including means for checking the demand signal and the engine speed signal and acting when the engine speed signal exceeds a predetermined value while the demand signal is substantially zero, to deenergise said relay so that the voltage applied to the power circuit and the speed sensing circuit is reduced by said resistor, said voltage if reduced to below a stand-by level by a fault in the power circuit, causing the speed signal to become insufficient whereby the control unit acts to prevent reenergisation of the relay, the reduced current avialable when said contacts are open being insufficient to maintain said valve closed.

According to a further feature of the invention the control unit includes further means for sensing the voltage applied to the power circuit and the engine speed sensing circuit whereby when said switch is closed during the starting of the engine, the control unit checks the voltage applied to the power circuit and said speed sensing circuit to ensure that the voltage is at said stand-by level before energising said relay.

An example of a control system in accordance with the invention will now be described with reference to the accompanying diagrammatic circuit diagram.

Referring to the circuit diagram there are provided terminals 10 and 11 for connection to a D.C. supply represented by an accumulator 12. A manually operable switch 13 is connected between the terminal 10 and the accumulator and this in practice will be the main control switch of the vehicle in which the engine is installed. The control circuit includes a control unit 14 which conveniently, is a micro-processor and it has supply lines connected to the terminals 10 and 11.

The control unit 14 will in practice receive a number of input signals representing various engine operating parameters but in particular it receives an engine speed signal from an engine speed sensing circuit 15 and a demand signal from a transducer 16. Power is supplied to the speed sensing circuit 15 by way of a resistor 17 which is connected to the terminal 10, the other supply to the circuit 15 being taken from the terminal 11.

Also provided is a power circuit 18 which also receives power through the resistor 17 and which controls the operation of the aforesaid electromagnetic valve 19. The power circuit receives control signals from the control unit 14. The control unit 14 is able to sense the voltage applied to the speed sensing circuit 15 and the power circuit this being achieved by a connection 20.

In parallel with the resistor 17 is a pair of normally open relay contacts 21 which form part of a relay which also includes a winding 22. One end of the winding is connected to the terminal 10 and the other end of the winding is connected to the control unit 14.

In normal operation of the control circuit the control unit 14 provides signals in timed relationship with the associated engine to the power circuit 18 so that the latter can energise the electromagnetic device associated with the valve 19. The valve 19 needs to be closed in order for fuel to be delivered to the associated engine. The control unit controls the amount of fuel supplied to the engine to ensure that the maximum governed speed of the engine is not exceeded and the amount of fuel supplied depends upon the demanded signal. The transducer 16 is connected to the throttle pedal of the vehicle and the greater the amount of fuel demanded by the driver the longer in a cycle of operation of the fuel pump will the valve 19 be closed. The control unit contains stored information so that it can ensure that other engine operating parameters are not exceeded.

A fault condition can occur where the power circuit 18 continuously maintains the valve closed. In this situation the maximum amount of fuel which the pump can deliver in an operating cycle will be delivered to the engine and besides causing smoke in the engine exhaust, the engine will accelerate in an uncontrolled manner. In this situation one can expect that the driver of the vehicle will have released his throttle pedal so that the demand signal is zero or substantially zero. The control unit checks the actual engine speed against the demand and when it sees that the engine speed has exceeded a preset speed above normal idling speed and the demand is substantially zero, it effects deenergisation of the relay winding 22. The effect of this is to open the relay contacts 21 so that the supply voltage applied to the power circuit 18 and the speed sensing circuit 15 is reduced by the voltage drop across the resistor 17. If a fault has occurred the voltage applied to both circuits will fall below a stand-by level because of the current flowing in the electromagnetic device. In this situation the signal provided by the speed sensing circuit to the control unit will fall to such a level that the control unit recognises the fault and will maintain the relay 22 in the deenergised condition. When the voltage applied to the power circuit is below the stand-by value the current flowing in the electromagnetic device associated with the valve is insufficient to maintain the valve in the closed position and hence as soon as the relay contacts 21 open the valve will move to the open position and the supply of fuel to the engine will cease.

There is a situation which can occur during normal operation of the vehicle in which the engine speed could exceed its normal governed speed and with a very low demand signal. This occurs in so-called "overrun" conditions that is to say when a vehicle is descending a hill. In this situation the winding 22 will again be deenergised and the contacts 21 opened. However, because there is no fault and no output from the control unit 14 requesting fuel, the voltage supplied to the speed sensing circuit and the power circuit falls to the stand-by level at which level the speed sensing circuit can maintain the speed signal to the control unit. The stand-by voltage level is not however sufficient to effect or maintain closure of the valve and the practical effect therefore is that the engine speed must fall to close to normal engine idling speed before the winding 22 is energised and the contacts 21 closed to restore the supply of fuel to the engine. If however a demand signal is supplied the control system will effect closure of the relay to enable fuel to be supplied to the associated engine.

The relay needs to be checked and this is effected when first attempting to start the engine. Upon closure of the switch 13 the control unit 14 is energised but it first senses the voltage applied to the speed sensing circuit and the power circuit to ensure that this is at the stand-by level, before energising the winding 22 to close the contacts 21.

We claim:

1. An electronic control system for a fuel pump of an internal combustion engine, the pump being of the type including an electromagnetically operable device which when energised ensures that the pump supplies fuel to the associated engine, the control system including a power circuit which controls the flow of current in the device and a control unit responsive to demanded and actual engine operating parameters for providing a control signal to said power circuit, the control system further comprising first and second terminals for connection to a source of electric supply by way of a manually operable switch, a resistor connected in series with one of said terminals and the power circuit, a relay having contacts connected in parallel with said resistor, said relay including a winding which is energised under the control of said control unit, to close said contacts, an engine speed sensing circuit which receives power from the end of the resistor remote from the supply terminal and which supplies an engine speed signal to the control unit, said control unit including means for checking the demand signal and the engine speed signal and acting when the engine speed signal exceeds a predetermined value while the demand signal is substantially zero, to deenergise said relay so that the voltage applied to the power circuit and the speed sensing circuit is reduced by said resistor, said voltage if reduced to below a stand-by level by a fault in the power circuit, causing the speed signal to become insufficient whereby the control unit acts to prevent reenergisation of the relay, the reduced current available when said contacts are open, being insufficient to maintain said valve closed.

2. A control system according to claim 1 including further means for sensing the voltage applied to the power circuit and the engine speed sensing circuit whereby when said switch is closed during the starting of the engine, the control unit checks the voltage applied to the power circuit and said speed sensing circuit to ensure that the voltage is at said stand-by level before energising said relay.

* * * * *